United States Patent Office 3,378,493
Patented Apr. 16, 1968

3,378,493
ANTI-FREEZING ADDITIVES
Charles H. Jacoby, Grosse Ile, and Frank V. Whelply, Dearborn, Mich., assignors to International Salt Company, Clarks Summit, Pa.
No Drawing. Continuation-in-part of application Ser. No. 345,859, Feb. 19, 1964. This application Mar. 29, 1965, Ser. No. 443,668
9 Claims. (Cl. 252—70)

This application is a continuation-in-part of application Ser. No. 345,859, filed Feb. 19, 1964, and now abandoned. This invention relates to means for protecting bulk particulate material from freezing and/or caking and, especially, this invention relates to such protection for bulk particulate sodium chloride.

Particulate sodium chloride or salt is subject to solidification from two separate and independent phenomena, caking and freezing. In caking, solidification may occur at any temperature and results from variations in moisture content of the particulate sodium chloride as effected by atmospheric conditions. Thus, a salt pile exposed to rainfall and subsequent drying will exhibit caking. Likewise, a salt pile exposed to fluctuation of humidity, but otherwise protected as for example, from rainfall, will also exhibit caking, albeit at a slower rate. Therefore, caking is a phenomenon resulting from alternate wetting and drying of particulate sodium chloride irrespective of temperature conditions. Freezing, on the other hand, is not necessarily accompanied by variations in moisture content of the salt but is, instead, a phenomenon associated with temperature in the presence of some moisture content which, incidentially, may be relatively low (i.e., 1–2%).

The additives according to this invention are formulations of a nonionic surfactant and calcium chloride; a nonionic surfactant and a water soluble complex iron cyanide; or a nonionic surfactant, calcium chloride and a water soluble complex iron cyanide, and when mixed in certain proportions herein specified and applied in a minor amount in uniform admixture with bulk particulate sodium chloride are effective to inhibit both caking and freezing of the bulk particulate sodium chloride.

The mechanism by which the additives of this invention act to obtain their effects is not clear. Nonionic surfactants are not known to inhibit freezing of bulk particulate sodium chloride and, indeed, we have found that no measurable effect in this direction is achieved. Likewise, nonionic surfactants are not known to inhibit caking of bulk particulate sodium chloride and we have likewise found no measurable effect in this direction. The use of water soluble complex iron cyanides as an anti-caking additive for bulk particulate sodium chloride is well known (Patent No. 3,036,884), but this additive has limited practical effect on the freezing tendency of bulk particulate sodium chloride. As disclosed in Patent No. 3,036,884, the term water soluble complex iron cyanides refers to alkaline metal and alkaline earth metal ferrocyanide and ferricyanide salts. In this regard, it should be noted that the use of a water soluble complex iron cyanide alone will lower the freezing temperature of a salt pile somewhat, but that such protection will not extend to temperatures lower than about 20° F. Calcium chloride may be added in small amounts (i.e., 5–10 pounds per ton) to bulk particulate sodium chloride to inhibit caking, but the addition of larger amounts of calcium chloride will actually increase the tendency toward caking; and calcium chloride is thus known only to inhibit caking to the extent that it is successful in "drying" the sodium chloride salt due to the hygroscopic nature of calcium chloride. Insofar as freezing protection is concerned, calcium chloride may be used for this purpose in amounts of 20 pounds per ton of salt or more. Thus, for the separate phenomena of caking and freezing, the following observations may be made:

Anti-caking

| | |
|---|---|
| Nonionic surfactants | No known effects. |
| Calcium chloride | 5–10 pounds per ton of salt effective. |
| Water soluble complex iron cyanide | Amounts greater than about .087 pound of ferrocyanide ion per ton of salt effective. |

Anti-freezing

| | |
|---|---|
| Nonionic surfactants | No known effects. |
| Calcium chloride | 20 pounds or more per ton of salt effective but caking sharply enhanced. |
| Water soluble complex iron cyanide | Effective down to about 20° F. |

It will thus be evident that if calcium chloride is used as an anti-freezing agent, the caking tendency of the bulk particulate sodium chloride is amplified; if a water soluble complex iron cyanide is used, caking is inhibited but protection against freezing is limited to temperatures above about 20° F. However, we have found that combinations of a nonionic surfactant with a water soluble complex iron cyanide or with calcium chloride, or with both when applied in minor amounts to bulk particulate sodium chloride act as powerful agents to inhibit both caking and freezing.

It will be obvious that a serious problem exists when salt containing even small amounts of moisture is exposed to temperatures at which freezing occurs. For example, at subfreezing temperatures particulate sodium chloride used for highway snow and ice removal becomes when wet so lumpy and/or solidified as to be virtually useless. Moreover, this problem may be rendered still more serious due to supercooling effects during transportation. Although the eutectic freezing point of sodium chloride brine is —6° F., the brine which exists in wet salt is ocmpletely saturated, and the solid phase which separates therefrom is sodium chloride dihydrate (NaCl·2H₂O) which forms at or below temperatures of 32.2° F. The dihydrate crystals bond the sodium chloride particles together in the phenomenon hereinabove referred to as "freezing."

It is, therefore, an object of this invention to provide an additive for particulate sodium chloride which is effective to inhibit freezing and consequent solidification of the salt even at very low ambient temperatures.

It is a further object of this invention to provide an additive as aforesaid in which the caking tendency of salt is also materially reduced so that one additive may be used to control both freezing and caking.

Another object of this invention is to provide an additive for salt which is economical in that only a relatively minor amount of the additive is needed to materially inhibit caking and/or freezing.

A further object of this invention resides in the provision of an additive, as aforesaid, which also displays the ability to lessen the tendency of brine formed from the treated salt to corrode or otherwise attack metals.

In most cases, additives containing all components (i.e., nonionic surfactant, calcium chloride and water soluble complex iron cyanide) display a greater degree of freezing temperature depression whereas additives containing the corresponding nonionic surfactant and only one of either calcium chloride or water soluble complex iron cyanide are somewhat less effective (i.e., higher freezing temperature). However, the reverse is true in some cases; that is, additives containing the nonionic surfactant with either calcium chloride or the complex iron cyanide alone may display the greatest anti-freezing effect, but in most such cases, it is the combination of nonionic surfactant plus calcium chloride which is the most effective. However, the effect is significant in any case and the additive mixture to be used in any particular instance may be chosen in the light of economic and other considerations such as resistance to leaching, corrosion inhibiting and availability of materials etc., and the ambient temperatures which are likely to prevail. In this regard, as has been mentioned, the solid phase sodium chloride dihydrate forms in saturated sodium chloride brine at about 32.2° F., whereas the eutectic point of saturated sodium chloride brine is approximately −6° F. We have found that nonionic surfactants, in general, when used in additive mixtures as hereinafter specified will materially depress the freezing of bulk particulate sodium chloride. Owing to the inevitable presence of impurities in sodium chloride as mined, particulate masses of such material will not display a tendency toward freezing at 32.2° F. as above specified but will, instead, commence freezing at a temperature within the range of about 25°–29° F. dependent upon the source and will, in any event, be reduced to intractable and useless masses at temperatures as high as 20° F. Although greater protection against freezing can be obtained by the addition of substantial amounts of calcium chloride, caking tendency is thereby materially increased or amplified and, as well, protection against freezing by the use of calcium chloride alone is costly due to the amount of calcium chloride required for this purpose. This can best be understood by the fact that calcium chloride is itself hygroscopic so that, when admixed with sodium chloride in small amounts (i.e., 5–10 pounds per ton as stated hereinbefore), the calcium chloride tends to "dry" the sodium chloride and to this inhibit caking. When, however, quantities of calcium chloride are present in amount to inhibit freezing (at least about 20 pounds of calcium chloride per ton of sodium chloride), so much moisture becomes picked up that an increase in sodium chloride saturated brine occurs to the extent that caking increases. It is for this reason that piles of calcium chloride and sodium chloride which are to be used in admixture for highway snow and ice removal must remain separate until just prior to use.

Thus, it will be appreciated that despite the use of additives such as calcium chloride or a water soluble complex iron cyanide which might be used to inhibit caking, say during summer storage, bulk particulate sodium chloride is vulnerable to the separate phenomenon of freezing commencing at relatively high temperatures. For all practical purposes, the temperature of 20° F. is regarded as that which will cause bulk particulate sodium chloride, even though treated with additives, to be rendered useless unless subjected to forcible breakage. As a consequence, during winter, bulk particulate sodium chloride storage piles will require manual or machine breaking to overcome freezing effects whereas bulk particulate sodium chloride transported by truck or rail will require breaking if unloading and handling are to be expected.

Thus, it will be seen that temperatures of 25° F. and lower are critical insofar as the freezing of bulk particulate sodium chloride is concerned. We have found that nonionic surfactants are in all cases useable, in additive mixtures as specified above, to inhibit freezing down to temperatures lower than 20° F. and, in most cases, to temperatures far below the eutectic point (−6° F.) of sodium chloride brine.

Specifically, it has been found that if a nonionic surfactant in the amount of at least about .025 pound per ton of sodium chloride is combined with calcium chloride in an amount of about 3–5 pounds per ton of sodium chloride or with a water soluble complex iron cyanide in an amount to provide about 1.3 to about .22 pound of ferrocyanide ion per ton of sodium chloride, or with both calcium chloride and a water soluble complex iron cyanide, both freezing and caking of the bulk particulate sodium chloride are inhibited to a significant degree.

The additives according to this invention may be grounded into two classes, I or II, according to the degree to which they inhibit freezing. Class I additives are effective to inhibit freezing of bulk particulate sodium chloride at temperatures below −10° F. while Class II additives are effective to inhibit freezing within the temperature range of −10° F. and less than 20° F. The following table enumerates a large variety of commercially available surface active agents and the classes within which they fall when admixed, as above, with the other component or components listed in the heading.

TABLE I

| Surfactant | CaCl₂ | Iron Cyanide | CaCl₂ and Iron Cyanide |
|---|---|---|---|
| Pluronic series: | | | |
| L-31 | II | II | II |
| L-33 | II | II | *I |
| L-35 | I | II | *I |
| F-38 | II | II | I |
| L-42 | II | II | I |
| L-43 | II | II | I |
| L-44 | I | II | II |
| P-46 | I | II | I |
| L-61 | I | II | II |
| L-62 | I | II | *I |
| L-63 | II | II | II |
| L-46 | I | II | II |
| P-65 | I | II | I |
| P-66 | II | II | I |
| F-68 | I | II | *I |
| L-72 | II | II | I |
| P-75 | II | II | II |
| F-77 | II | II | II |
| P-84 | I | II | I |
| P-85 | II | II | I |
| F-88 | II | II | I |
| L-92 | II | II | II |
| P-94 | II | II | II |
| F-98 | II | II | I |
| L-103 | I | II | I |
| P-104 | I | II | I |
| P-105 | I | II | I |
| F-108 | I | II | I |
| L-122 | II | II | I |
| P-123 | II | II | I |
| Tetronic series: | | | |
| 304 | II | II | I |
| 501 | II | II | I |
| 504 | I | II | II |
| 701 | II | II | II |
| 702 | II | II | I |
| 704 | II | II | I |
| 707 | II | II | I |
| 904 | I | II | II |
| 908 | II | II | II |
| Plurafac series: | | | |
| A-16 | I | II | *I |
| A-26 | II | II | I |
| Syntergent K | I | II | I |
| Hyonic series: | | | |
| LA-40 | I | *I | I |
| LA-45 | I | *I | I |
| LA-50 | I | *I | I |
| LA-70 | II | I | I |
| PE-50 | I | I | *I |
| PE-70 | I | II | I |
| PE-90 | II | I | I |
| PE-100 | I | II | *I |
| PE-120 | I | I | I |
| PE-150 | I | II | II |
| PE-200 | I | II | I |
| FA-20 | I | I | I |
| FA-40 | I | I | II |
| FS | I | II | I |
| Nopalcol series: | | | |
| 1-L | I | II | II |
| 2-O | I | II | *I |
| 2-R | I | I | *I |
| 4-L | I | I | *I |
| 4-O | I | II | I |
| 6-L | I | I | I |
| 6-O | I | II | II |
| 6-R | I | I | *I |
| 10-R | II | II | II |
| 10-S | II | II | II |

TABLE I.—Continued

| Surfactant | CaCl₂ | Iron Cyanide | CaCl₂ and Iron Cyanide |
|---|---|---|---|
| Igepal series: | | | |
| CA-720 | I | II | I |
| CO-520 | I | I | *I |
| CO-530 | I | II | I |
| CO-610 | I | II | I |
| CO-630 | II | II | I |
| CO-730 | II | II | I |
| CO-850 | I | II | I |
| CO-890 | II | II | I |
| CO-970 | II | II | I |
| CTA-639 | II | II | I |
| DM-430 | I | II | *I |
| DM-530 | I | II | *I |
| DM-710 | I | II | I |
| DM-730 | II | I | I |
| DM-970 | II | II | I |
| Emulphobene series: | | | |
| BC-610 | I | II | I |
| BC-720 | II | II | I |
| Emulphor EL-620 | I | II | *I |
| Diazopon SS-837 | I | I | *I |
| Gafamide series: | | | |
| CD-115 | I | II | *I |
| CD-116 | I | II | II |
| CD-518 | *I | II | I |
| LD-176 | I | I | I |
| LMD-136 | II | I | *I |
| LMD-549 | I | II | *I |
| Dowfax series: | | | |
| 9N9 | II | I | *I |
| 9N10 | II | I | *I |
| 9N15 | II | II | I |
| 9N20 | II | II | I |
| 9N40 | II | II | I |
| Surfynol 82 | II | II | I |
| Atlas series: | | | |
| G 2162 | I | II | *I |
| MYRJ 52 | II | II | I |
| BRIJ 58 | II | II | II |
| Hercules series: | | | |
| AD-160 | I | II | *I |
| AD-400 | I | II | *I |
| AR-150 | I | II | II |
| Olin series: | | | |
| 10G | I | II | I |
| 6G | I | II | *I |
| Victawet 12 | II | II | I |
| Triton X-100 | I | II | I |
| Witcamide 272 | II | II | I |

In the above table, it will be noted that there are many instances in which Class I anti-freezing protection is obtained by two or more of the three formulations noted. In such instances, where there is noticeably greater protection afforded by a particular formulation, an asterisk is noted to indicate this fact. However, the presence of an asterisk is not to be taken as an indication that the other formulations of a corresponding row may not be preferred. In this regard, it will be understood that, at presently prevailing prices, a formulation of surfactant plus sodium ferrocyanide decahydrate is somewhat less expensive than a formulation of the same surfactant plus calcium chloride, the three-component formulation necessarily being the most costly. When it is realized that many hundreds or even thousands of tons may be involved in a single stockpile, it can be appreciated that cost may constitute a controlling factor in the selection of a particular formulation.

The pluronic series of surfactants are block type copolymers of ethylene and propylene oxides manufactured by Wyandotte Chemical Company of Wyandotte, Michigan. These polymers are made, for example, in accord with the disclosures of Patent #2,674,619; #2,677,700; #2,706,181; #2,706,189; and may be represented generically according to the following structure:

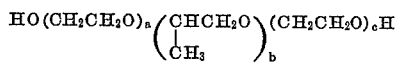

In these polymers, a polypropylene glycol of the desired molecular weight is first prepared and ethylene oxide is added thereto, yielding a product as above having a hydrophobic central portion with two hydrophilic ends. These surfactants are identified by molecular weight of the hydrophobe and percentages as to hydrophobic-hydrophilic balance. Thus, Pluronic F 108 identifies itself first by the last digit (8) which indicates that 80% of the total molecule is polyoxyethylene and second by the first number (10) which is indicative of the molecular weight of the polyoxypropylene hydrophobic base.

The Tetronic series of surfactants are from the same source as the Pluronics and are propylene and ethylene oxide adducts of ethylenediamine and may be represented generically as follows:

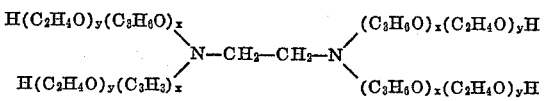

The Plurafac series of surfactants are also from the same source as the Pluronics and are ethoxylated straight chain alcohols.

Syntergent K is available from Nopco Chemical Company of Newark, New Jersey, and is a modified coconut fatty acid alkylolamide.

The Hyonic LA and FA series of surfactants and Hyonic FS are available from the same source as Syntergent K and are similar thereto. Syntergent K, the Hyonic LA and FA series and Hyonic FS are fatty acid (coconut, lauric, myristic) esters of diethanolamine as represented, for example, by the disclosure of Example I of Patent No. 2,089,212.

The Hyonic PE series of surfactants are alkyl phenoxy (ethenoxy) ethanols and are, specifically, a homologous series of octyl phenol condensates containing from 5 to 20 moles of ethylene oxide per mole of octyl phenol.

The Nopalcol series of surfactants are available from Nopco Chemical Company and are polythylene glycol fatty acid esters.

The Igepal series of surfactants are octyl-, nonyl-, or dialkyl phenoxy (ethenoxy) ethanols available from General Aniline and Film Corporation of New York, N.Y. This series of surfactants is similar to the Hyonic PE series mentioned above.

The Emulphogene series of surfactants are of the same source as the Igepal series and are tridecyloxy (ethenoxy) ethanols. Emulphor EL-620 is an ethoxylated vegetable oil while Diazopon is an ethoxylated fatty alcohol; both available from General Aniline and Film Corporation.

The Gafamide series of surfactants are available from General Aniline and Film Corporation, being fatty acid diethanolamides similar to the Hyonic LA and FA series mentioned above.

The Dowfax series of surfactants are available from the Dow Chemical Company of Midland, Mich., and are nonyl phenoxy (ethenoxy) ethanols similar to the Hyonic PE series.

Surfynol 82 is available from Air Reduction Chemical and Carbide Company of New York, N.Y. and is 3,6-dimethyl-4-octyne-3, 6-diol.

The Atlas series of surfactants are available from Atlas Chemical Industries of Wilmington, Delaware. G 2162 is a polyoxyethylene oxypropylene monostearate; MYRJ 52 is a polyoxyethylene stearate; and BRIJ 58 is a polyoxyethylene cetyl ether.

The Hercules series of surfactants are available from Hercules Powder Company of Wilmington, Delaware. AD-160 and AD-400 are polyethylene glycol ethers of hydroabiethyl alcohol; and AR-150 is a polyethylene glycol ether of rosin.

The Olin series of surfactants are available from Olin Mathieson Chemical Corporation of New York, N.Y.

Victawet 12 is available from Victor Chemical Division of Stauffer Chemicals of New York, N.Y., and is a phosphate-containing alkyl surfactant.

Triton X-100 is an octyl phenoxy (ethenoxy) ethanol available from Rohm and Haas Company of Philadelphia, Pennsylvania.

Witcamide 272 is a fatty acid alkanolamide available from Witco Chemical Company of New York, N.Y.

In the additives of this invention, the nonionic surfactant must be present in an amount of at least about .025 pound per ton of sodium chloride (i.e. about 10 parts per million) whereas its upper limit is not critical, being dictated by practical considerations. However, in all of the formulations herein, the amount of nonionic surfactant used does to some extent affect the degree of protection against freezing. That is, as the amount of nonionic surfactant is increased from .025 pound per ton of sodium chloride, lowering of the freezing point will occur. However, the most marked results in this direction appear to occur within the range of .025 to about .1 pound of nonionic surfactant per ton of sodium chloride, with further increase in the amount of nonionic surfactant producing little, if any, lowering of the freezing temperature. Utilization of less than about .025 pound of nonionic surfactant per ton of sodium chloride sharply degrades anti-freezing performance. Thus, for these reasons and for the reason that substantial protection against freezing is desired as a general rule, it is preferred to use the nonionic surfactant in the amount of at least about .1 pound per ton of sodium chloride.

Insofar as the calcium chloride is concerned, we have found that it must be added in such amount that at least about 3 pounds of calcium chloride per ton of sodium chloride is present when considering the amount of naturally occurring calcium chloride which may already be present in the sodium chloride as mined. Preferably, we use calcium chloride in an amount to represent, in the additive itself, about 3-4 pounds per ton of sodium chloride. As to an upper limit, about 5 pounds of additive calcium chloride per ton of sodium chloride appears to fit this definition since such amount will insure the presence of this component within the required range and no beneficial effect is achieved by exceeding this amount.

Insofar as the water soluble complex iron cyanide is concerned, its limits are about .13–.22 pound of ferrocyanide ion per ton of sodium chloride, the lower limit being dictated by degradation of freezing protection and the upper limit by cost considerations based upon the fact that no beneficial effects are achieved by exceeding this limit. Based upon sodium ferrocyanide decahydrate, this range of ferrocyanide ion content corresponds to .3 and .5 pound of this preferred water soluble complex iron cyanide per ton of sodium chloride. Another preferred water soluble complex iron cyanide is potassium ferrocyanide trihydrate. The preferred amount of ferrocyanide ion is about .17 pound per ton of sodium chloride.

Sight should not be lost of the anti-caking properties of the present invention, as distinguished and aside from the anti-freezing properties, for marked improvements are achieved in this direction also. To appreciate this, it must be borne in mind that for anti-caking, it requires a minimum of about .0085 pound of ferrocyanide ion per ton of sodium chloride to achieve this result, whereas formulations according to the present invention having about half this amount of ferrocyanide ion per ton of sodium chloride will achieve the same degree of anti-caking effect while, at the same time, being more resistant to leaching and being effective to achieve anti-corrosive effects. In general, the formulations of this invention may be reduced from the preferred amounts by a factor of about 40 to obtain anti-caking protection without anti-freezing protection.

The following specific examples are given to illustrate certain preferred formulations as compared to a control example containing only a water soluble complex iron cyanide. In all cases, the bulk particulate sodium chloride stockpiles were completely exposed to the atmosphere and no attempt, other than the additives used, was made to protect the stockpiles.

EXAMPLE I

This was the control stockpile and consisted of approximately 1000 tons of bulk particulate sodium chloride having .4 pound of sodium ferrocyanide decahydrate per ton of sodium chloride thoroughly and uniformly mixed throughout the pile.

EXAMPLE II

This example consisted of a bulk particulate sodium chloride stockpile of approximately 1000 tons having the following formulation thoroughly and uniformly admixed therewith:

|  | #/ton |
|---|---|
| Plurafac A-16 | 0.1 |
| Sodium ferrocyanide decahydrate | 0.4 |
| Calcium chloride | 4.0 |

EXAMPLE III

This example consisted of a bulk particulate sodium chloride stockpile of approximately 1000 tons having the following formulation thoroughly and uniformly admixed therewith:

|  | #/ton |
|---|---|
| Tetronic 304 | 0.1 |
| Sodium ferrocyanide decahydrate | 0.4 |
| Calcium chloride | 3.2 |

EXAMPLE IV

This example consisted of a bulk particulate sodium chloride stockpile of approximately 600 tons having the following formulation thoroughly and uniformly admixed therewith:

|  | #/ton |
|---|---|
| Dowfax 9N10 | 0.1 |
| Sodium ferrocyanide decahydrate | 0.4 |
| Calcium chloride | 3.2 |

EXAMPLE V

This example consisted of a bulk particulate sodium chloride stockpile of approximately 500 tons having the following formulation thoroughly and uniformly admixed therewith:

|  | #/ton |
|---|---|
| Igepal CO-520 | 0.1 |
| Sodium ferrocyanide decahydrate | 0.4 |
| Calcium chloride | 3.2 |

EXAMPLE VI

This example consisted of a bulk particulate sodium chloride stockpile of approximately 400 tons having the following formulation thoroughly and uniformly admixed therewith:

|  | #/ton |
|---|---|
| Igepal CO-520 | 0.1 |
| Sodium ferrocyanide decahydrate | 0.4 |

All of the above stockpiles were located in adjacent areas and tested at substantially the same time to compare the effectiveness of the various additives under severe winter conditions. In all of Examples II-VI, the stockpiles displayed soft, easily worked crusts of little thickness whereas the control stockpile of Example I displayed, at the same times, a hard frozen crust of at least six inches thickness.

The additives of this invention must be as thoroughly and uniformly admixed with the sodium chloride as is possible. To this end, dry mixing may be used but the spraying of aqueous solutions or dispersions of the additives is preferred.

As used herein, the term "nonionic surfactant" means a synthetic nonionic surface active agent, and "water soluble complex iron cyanide" means a complex iron cyanide which is water soluble in the classical sense, as exemplified by sodium ferrocyanide decahydrate and as distinguished from the essentially water insoluble complex iron cyanides.

Based upon one part nonionic surfactant, the ranges of calcium chloride and ferrocyanide ion, respectively, are about 10/1–200/1 and about 5/1–9/1. Based upon the particulate sodium chloride and defined as parts per million parts of sodium chloride, the ranges are as follows:

|  | p.p.m. |
|---|---|
| Nonionic surfactant | 12–125 |
| Calcium chloride | 1500–2500 |
| Ferrocyanide ion | 65–110 |

The above ranges apply to cases in which protection against both freezing and caking are desired. When caking alone is to be considered, the minimum amounts of the components, in parts per million parts of sodium chloride, are as follows:

|  | P.P.M. |
|---|---|
| Nonionic surfactant | 1 |
| Calcium chloride | 40 |
| Ferrocyanide ion | 5 |

Whereas only one form of the invention has been illustrated and described in detail hereinabove, it will be understood that various changes may be made therein without departing from the spirit of the invention or the scope of the following claims.

We claim:

1. An additive for inhibiting freezing and caking of particulate sodium chloride, consisting of:
   one part by weight of a nonionic synthetic surface active agent,
   and about 10 to about 200 parts by weight of calcium chloride.

2. An additive for inhibiting freezing and caking of particulate sodium chloride, consisting of:
   one part by weight of a nonionic synthetic surface active agent,
   and a water soluble complex iron cyanide selected from the group consisting of alkali metal ferrocyanide salts and alkaline earth metal ferrocyanide salts providing ferrocyanide ion in amount of about .5 to about 9 parts by weight.

3. An additive for inhibiting freezing and caking of particulate sodium chloride, consisting of:
   one part by weight of a nonionic synthetic surface active agent,
   a water soluble complex iron cyanide selected from the group consisting of alkali metal ferrocyanide salts and alkaline earth metal ferrocyanide salts in amount sufficient to provide ferrocyanide ion in an amount of about 0.5 to about 9.0 parts by weight,
   and about 10 to about 200 parts by weight of calcium chloride.

4. Conditioned sodium chloride particles resistant to freezing and/or caking, comprising sodium chloride particles having at least a partial coating of a compound consisting of:
   (a) a nonionic synthetic surface active agent, and
   (b) calcium chloride, in which the calcium chloride is present in an amount of about 10 to about 200 times the quantity of the water soluble synthetic detergent and is at least about 3 pounds per ton of sodium chloride, and the nonionic synthetic surface active agent is present in an amount at least about 10 parts per million parts of the sodium chloride by weight.

5. Conditioned sodium chloride particles resistant to freezing and/or caking, comprising sodium chloride particles having at least a partial coating of a compound consisting of:
   (a) a nonionic synthetic surface active agent, and
   (b) a water soluble complex iron cyanide, in which the water soluble complex iron cyanide selected from the group consisting of alkali metal ferrocyanide salts and alkaline earth metal ferrocyanide salts is present in an amount sufficient to provide ferrocyanide ion in an amount of about .5 to about 9 times the quantity of nonionic surface active agent and at least about .13 pound per ton of sodium chloride, and the nonionic synthetic surface active agent is present in an amount at least about 10 parts per million of the sodium chloride by weight.

6. Conditioned sodium chloride particles resistant to freezing and/or caking, comprising sodium chloride particles having at least a partial coating of a compound consisting of:
   (a) a nonionic synthetic surface active agent
   (b) calcium chloride, and
   (c) a water soluble complex iron cyanide selected from the group consisting of alkali metal ferrocyanide salts and alkaline earth metal ferrocyanide salts in which the calcium chloride is present in an amount of about 10 to about 200 times the quantity of the water soluble synthetic detergent and is at least about 3 pounds per ton of sodium chloride, the water soluble complex iron cyanide is present in an amount sufficient to provide ferrocyanide ion in amount of about .5 to about 9 times the quantity of nonionic surface active agent and at least about .13 pound per ton of sodium chloride, and the nonionic synthetic surface active agent is present in an amount at least about 10 parts per million of the sodium chloride by weight.

7. The process of inhibiting the freezing and caking of granular sodium chloride which comprises:
   applying an additive consisting essentially of a nonionic synthetic surface active agent and calcium chloride to the granular sodium chloride in minor amount sufficient to at least partially coat the granular sodium chloride and inhibit freezing and caking tendencies thereof.

8. The process of inhibiting the freezing and caking of granular sodium chloride which comprises:
   applying an additive consisting essentially of a nonionic synthetic surface active agent and a water soluble complex iron cyanide selected from the group consisting of alkali metal ferrocyanide salts, alkaline earth metal ferrocyanide salts, alkaline metal ferricyanide salts and alkaline earth metal ferricyanide salts to the granular sodium chloride in minor amount sufficient to partially coat the granular sodium chloride and inhibit freezing and caking tendencies thereof.

9. The process of inhibiting the freezing and caking of granular sodium chloride which comprises:
   applying an additive consisting essentially of a water soluble complex iron cyanide selected from the group consisting of alkali metal ferrocyanide salts, alkaline earth metal ferrocyanide salts, alkaline metal ferricyanide salts and alkaline earth metal ferricyanide salts, a nonionic synthetic surface active agent and calcium chloride to the granular sodium chloride in minor amount sufficient to at least partially coat the granular sodium chloride and inhibit the freezing and caking tendencies thereof.

References Cited

UNITED STATES PATENTS

| 2,104,619 | 1/1938 | Lehmann | 252—385 |
| 2,539,012 | 1/1951 | Diamond et al. | 23—89 X |
| 3,034,858 | 5/1962 | Vives | 252—383 |
| 3,090,756 | 5/1963 | Kaufmann | 252—70 |

MURRAY KATZ, ALBERT T. MEYERS, LEON D. ROSDOL, *Examiners.*

J. D. WELSH, S. D. SCHWARTZ, *Assistant Examiners.*

UNITED STATES PATENT OFFICE
CERTIFICATE OF CORRECTION

Patent No. 3,378,493                          April 16, 1968

Charles H. Jacoby et al.

It is hereby certified that error appears in the above numbered patent requiring correction and that the said Letters Patent should read as corrected below.

Column 2, line 45 "ocmpletely" should read -- completely --. Column 4, line 2, "1.3" should read -- .13 --; line 8, "grounded" should read -- grouped --; TABLE I, first column, line 13 thereof, "L-46" should read -- L-64 --; same TABLE, third column, line 59 thereof, "I" should read -- II --. Column 5, TABLE I-Continued, first column, line 17 thereof, "Emulphobene" should read -- Emulphogene --. Column 6, lines 6 to 10, the left-hand portion of the formula should appear as shown below:

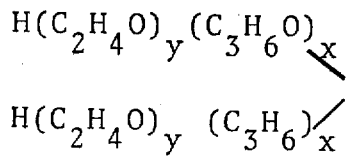

Signed and sealed this 23rd day of September 1969.

(SEAL)
Attest:

EDWARD M. FLETCHER, JR.                     WILLIAM E. SCHUYLER, JR.
Attesting Officer                               Commissioner of Patents